US008804611B2

(12) United States Patent
Sridhara et al.

(10) Patent No.: US 8,804,611 B2
(45) Date of Patent: Aug. 12, 2014

(54) METHOD AND APPARATUS FOR ACKNOWLEDGING SUCCESSFUL RECEPTION OF A DATA TRANSMISSION FOR MULTI-ACCESS COMPATIBILITY IN A WIRELESS COMMUNICATION SYSTEM

(75) Inventors: Vinay Sridhara, Santa Clara, CA (US); Vincent Knowles Jones, IV, Redwood City, CA (US)

(73) Assignee: QUALCOMM Incorporated, San Diego, CA (US)

(*) Notice: Subject to any disclaimer, the term of this patent is extended or adjusted under 35 U.S.C. 154(b) by 756 days.

(21) Appl. No.: 12/535,543

(22) Filed: Aug. 4, 2009

(65) Prior Publication Data

US 2010/0202347 A1 Aug. 12, 2010

Related U.S. Application Data

(60) Provisional application No. 61/152,197, filed on Feb. 12, 2009.

(51) Int. Cl.
*H04W 40/00* (2009.01)

(52) U.S. Cl.
USPC .......... 370/328

(58) Field of Classification Search
USPC ......... 370/330, 389, 208, 335, 474, 329, 312, 370/310, 328, 333, 349, 432; 455/422.1; 709/237, 231; 340/573.1
See application file for complete search history.

(56) References Cited

U.S. PATENT DOCUMENTS

| | | | | |
|---|---|---|---|---|
| 5,577,024 A | | 11/1996 | Malkamaki et al. | |
| 7,631,240 B2 | | 12/2009 | Frederiks et al. | |
| 8,027,366 B1 | * | 9/2011 | Tang et al. .................... | 370/474 |
| 8,300,582 B2 | | 10/2012 | Malladi et al. | |
| 2002/0133615 A1 | * | 9/2002 | Satran et al. .................. | 709/237 |
| 2004/0062221 A1 | * | 4/2004 | Gopalakrishnan et al. ... | 370/335 |
| 2004/0203377 A1 | | 10/2004 | Eaton et al. | |
| 2005/0002355 A1 | | 1/2005 | Takano | |
| 2005/0050219 A1 | * | 3/2005 | Choi et al. .................... | 709/231 |
| 2005/0180315 A1 | * | 8/2005 | Chitrapu et al. ............. | 370/208 |

(Continued)

FOREIGN PATENT DOCUMENTS

| | | |
|---|---|---|
| EP | 2056505 A1 | 5/2009 |
| JP | 2004328570 A | 11/2004 |
| JP | 2006060515 A | 3/2006 |
| JP | 2006129393 A | 5/2006 |

(Continued)

OTHER PUBLICATIONS

Kuzminskiy A M et al., "Downlink SDMA for legacy IEEE 802.11 A/G mobile stations: acknowledgement recovery and channel estimation", Signal Processing Advances in Wireless Communications, 2005 IEEE GTH Workshop on New York, NY, USA, Jun. 2-8, 2005, Piscataway, NJ, USA,IEEE, Jun. 2, 2005, pp. 216-220, XP010834342.

(Continued)

*Primary Examiner* — Obaidul Huq
*Assistant Examiner* — Syed M Bokhari
(74) *Attorney, Agent, or Firm* — Kevin T. Cheatham

(57) ABSTRACT

A method of wireless communication for acknowledging receipt of a packet is disclosed that includes determining that the packet has been received successfully; and, generating an acknowledgment (ACK) message upon the determination that the packet is received successfully, wherein the ACK message includes a unique identifier associated with a receiver used to receive the packet. An apparatus for performing the method is also disclosed herein.

38 Claims, 12 Drawing Sheets

WIRELESS NETWORK 100
AT 120
AP 110
SYSTEM CONTROLLER 130
TO OTHER ACCESS POINTS
TO OTHER NETWORKS

(56) References Cited

U.S. PATENT DOCUMENTS

| | | | | |
|---|---|---|---|---|
| 2006/0092871 | A1 | 5/2006 | Nishibayashi et al. | |
| 2007/0194938 | A1 * | 8/2007 | Mitchell | 340/573.1 |
| 2007/0211667 | A1 * | 9/2007 | Agrawal et al. | 370/335 |
| 2007/0248114 | A1 | 10/2007 | Jia et al. | |
| 2009/0059834 | A1 * | 3/2009 | Qian | 370/312 |
| 2009/0154405 | A1 * | 6/2009 | Choi et al. | 370/329 |
| 2009/0168770 | A1 * | 7/2009 | Mohanty | 370/389 |
| 2010/0197295 | A1 * | 8/2010 | Horangic | 455/422.1 |
| 2012/0120912 | A1 | 5/2012 | Lu et al. | |

FOREIGN PATENT DOCUMENTS

| | | |
|---|---|---|
| WO | WO0072498 | 11/2000 |
| WO | 2008004609 | 1/2008 |

OTHER PUBLICATIONS

International Search Report and Written Opinion—PCT/US10/023937, International Search Authority—European Patent Office, May 7, 2010.

Yale University: “Ethernet”, Apr. 12, 1995, XP002576557.

Taiwan Search Report—TW099104884—TIPO—Jan. 23, 2014.

* cited by examiner

300

700

METHOD AND APPARATUS FOR ACKNOWLEDGING SUCCESSFUL RECEPTION OF A DATA TRANSMISSION FOR MULTI-ACCESS COMPATIBILITY IN A WIRELESS COMMUNICATION SYSTEM

CLAIM OF PRIORITY UNDER 35 U.S.C. §119

The present Application for Patent claims priority to Provisional Application No. 61/152,197, entitled "Method and Apparatus for Acknowledging Successful Reception of a Data Transmission for Multi-Access Compatibility in a Wireless Communication System" filed Feb. 12, 2009, and assigned to the assignee hereof and hereby expressly incorporated by reference herein.

BACKGROUND

I. Field

The following description relates generally to communication systems, and more particularly, to a method and apparatus for facilitating acknowledging successful reception of data transmission for multi-access compatibility in a wireless communication system.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple In, Multiple Out (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface (air link medium) standards developed by the IEEE 802.11 committee for short-range communications (e.g., tens of meters to a few hundred meters).

One main feature offered by wireless systems like ones that conform to the IEEE 802.11 WLAN standard is the acknowledgement of successfully received packets. Packets are also referred to as frames. Successfully received frames are those, for example, that did not collide with other transmissions; were received with a reception power above the receiver sensitivity threshold; and properly decoded at the receiver. In this IEEE 802.11 WLAN system, an acknowledgment (ACK) is sent by the receiver to the transmitter of the PLCP (Physical Layer Convergence Protocol) Protocol Data Unit (PPDU) upon successful reception of the PPDU. The ACK is sent by the receiver of the PPDU after a period referred to as a Short Interframe Space (SIFS) time so that there is enough time to decode the packet, to check if the frame was intended for the decoding station, and to check for the presence of errors by computing a Cyclic Redundancy Check (CRC).

In wireless communication systems, Medium Access Control (MAC) protocols are designed to exploit several dimensions of freedom offered by the air link medium. The most commonly exploited dimensions of freedom are time and frequency. For example, in the IEEE 802.11 MAC protocol, the time dimension of freedom is exploited through the Carrier Sense Multiple Access (CSMA) protocol. The CSMA protocol attempts to ensure that no more than one transmission occurs in a neighborhood of potential high interference. The frequency dimension of freedom can be exploited by using different channels created by assigning different frequency bandwidths to each channel.

Recent developments have led to the space dimension being a viable option using an approach referred to as Spatial Division Multiple Access (SDMA) can be used for improving utilization of the air link medium by scheduling multiple terminals for simultaneous transmission and reception. Data is sent to each of the terminals using one or more spatial streams. Specifically, a transmitter forms spatial streams of transmission ("transmission streams") to individual receivers. The spatial streams are orthogonal to each other. Such orthogonal spatial streams may be formed because the transmitter has several antennas and the transmit/receive channel consists of several paths. The receivers may also have one or more antennas such as implemented in receivers supporting Single In, Multiple Out (SIMO) or MIMO transmission methodology.

When a transmitting device, such as an access point, has packets to transmit in multiple stop and wait data flows to different receiving stations, such as access terminals, the transmitting device can use any one of several previously identified approaches to transmit data on the downlink. For example, downlink transmissions may utilize any of the TDMA, CDMA or SDMA transmission methodologies using Aggregate PPDU (APPDU) or OFDMA.

On the uplink, it is expected that all the different receiving stations that have received the transmission successfully shall send an ACK frame back to the transmitting device. It is often most efficient to use a multiple access method such as SDMA or OFDMA to schedule the simultaneous transmission of ACK frames. However, due to the configuration of the current ACK methodology, there is no way the original transmitting station, which is now a receiving station receiving the ACK, can distinguish the ACK from one station to another. Conversely, if one of the receiving stations fails to send an ACK, there is no way for the original transmitting station to know, which of the receivers did not acknowledge. This is due to the reason that there is no unique information about the transmitting station in this ACK frame format. Hence with the current frame format, the common way to transmit ACK frames would be to schedule these ACK frames to be transmitted in a time-staggered, serial fashion.

Consequently, it would be desirable to address one or more of the deficiencies described above.

SUMMARY

According to various aspects, the subject innovation relates to systems and/or methods for facilitating sending asynchronous acknowledgement (ACK) messages, from a plurality of receiving stations, that a plurality of packets transmitted by a transmitting station to the plurality of receiving stations was successfully received.

According to another aspect of the disclosure, a method of wireless communication for acknowledging receipt of a packet is provided. The method includes determining that the packet has been received successfully; and, generating an ACK message upon the determination that the packet is received successfully, wherein the ACK message includes a unique identifier associated with a receiver used to receive the packet.

According to yet another aspect of the disclosure, an apparatus for wireless communication for acknowledging receipt of a packet is provided. The apparatus includes means for determining that the packet has been received successfully; and, means for generating an ACK message upon the determination that the packet is received successfully, wherein the ACK message includes a unique identifier associated with a receiver used to receive the packet.

According to yet another aspect of the disclosure, an apparatus for wireless communication for acknowledging receipt of a packet is provided. The apparatus includes a processing system. The processing system is configured to determine that the packet has been received successfully; and, generate an ACK message upon the determination that the packet is received successfully, wherein the ACK message includes a unique identifier associated with a receiver used to receive the packet.

According to yet another aspect of the disclosure, a computer-program product for communication for acknowledging receipt of a packet is disclosed. The computer-program product includes a machine-readable medium encoded with instructions executable by a processor to cause the processor to determine that the packet has been received successfully; and, generate an ACK message upon the determination that the packet is received successfully, wherein the ACK message includes a unique identifier associated with a receiver used to receive the packet.

According to yet another aspect of the disclosure, an access terminal is disclosed. The access terminal includes a wireless network adapter configured to acknowledge receipt of a packet; and a processing system. The processing system is configured to determine that the packet has been received successfully; and, generate an ACK message upon the determination that the packet is received successfully, wherein the ACK message includes a unique identifier associated with a receiver used to receive the packet.

According to yet another aspect of the disclosure, an access point is disclosed. The access point includes a wireless network adapter configured to receive an ACK message from an access terminal in a plurality of access terminals; and a processing system configured to decode the ACK message to determine a unique identity of the access terminal.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

These and other sample aspects of the disclosure will be described in the detailed description that follow, and in the accompanying drawings, wherein.

Figure 1:
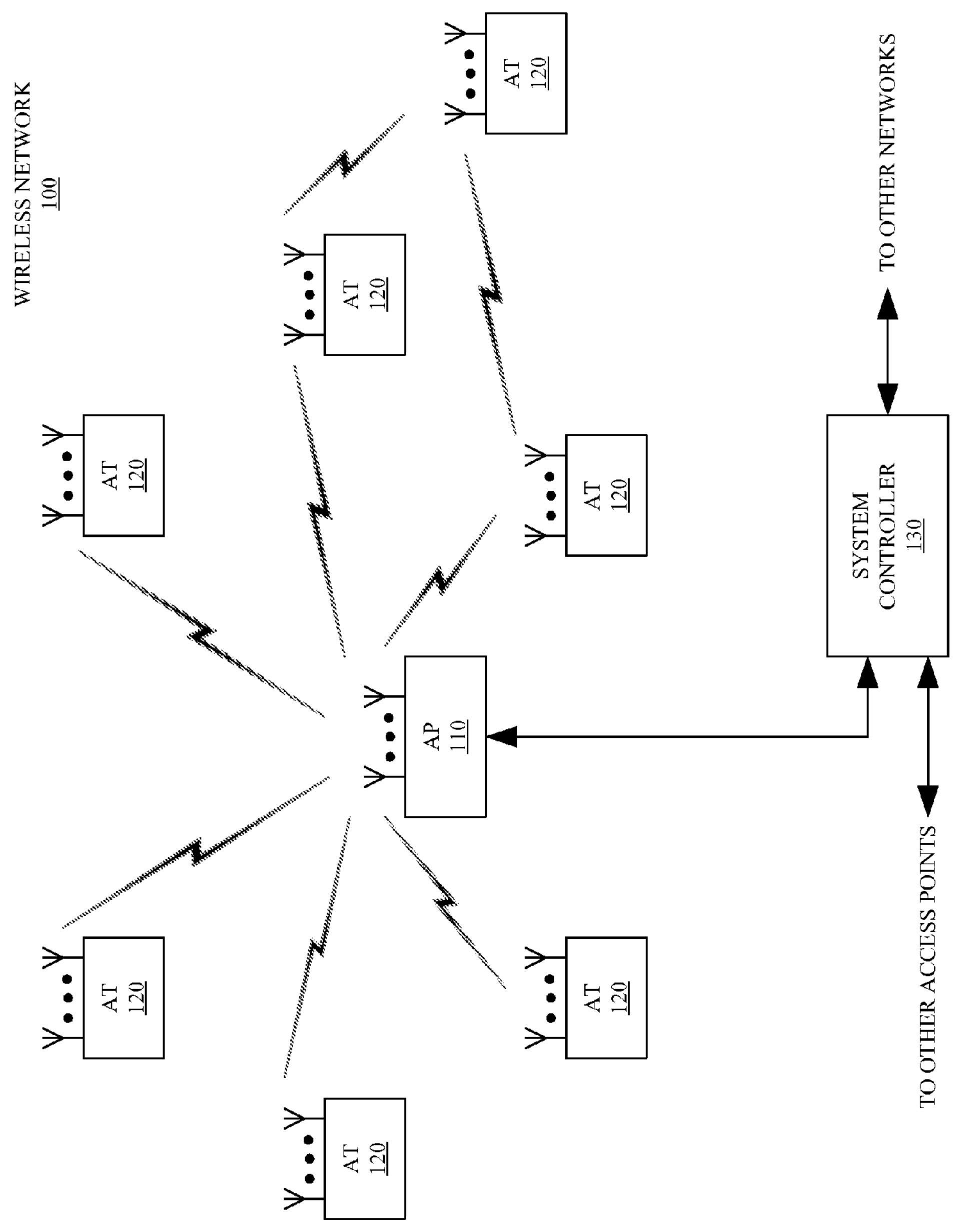
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In the improved transmission acknowledgment approaches described herein, an acknowledgment (ACK) frame that is transmitted from a transmitting station, to a receiving station includes unique identifying information about the transmitting station transmitting the ACK. The receiving station was the original transmitting station and the transmitting station was an originally receiving. The unique identifying information may include such information as the transmitter MAC address, or the transmitter station identifier (ID) in the ACK frame. In one aspect, the ID is uniquely allocated for each associated device at the time of association with a length of sixteen (16) bits. As a result, the ACKs that are simultaneously transmitted from multiple transmitting stations using multiple access methods such as Spatial Division Multiple Access (SDMA) or Orthogonal Frequency Division Multiple Access (OFDMA) can be uniquely identified by the receiving station, which was the original transmitting station. Thus, the receiving station can identify which original receiving stations did not receive the original transmission.

Several aspects of a wireless network 100 that includes the transmission ACK methodology will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using SDMA. SDMA is a multiple access scheme which enables multiple streams transmitted to different receivers at the same time to share the same frequency channel and, as a result, provide higher user capacity. This is achieved by spatially preceding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support Multiple In, Multiple Out (MIMO) technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a MAC layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node in a transmit mode, the application layer processes data, segments the data into packets, and provides the data packets to the MAC layer. The MAC layer assembles MAC packets with each data packet from the application layer being carried by the payload of a MAC packet. Alternatively, the payload for a MAC packet may carry a fragment of a data packet or multiple data packets from the application layer. Each MAC packet includes a MAC header and an error detection code. The MAC packet is sometimes referred to as a MAC Protocol Data Unit (MPDU), but may also be referred to as a frame, packet, timeslot, segment, or any other suitable nomenclature.

When the MAC decides to transmit, it provides a block of MAC packets to the PHY layer. The PHY layer assembles a PHY packet by assembling the block of MAC packets into a payload and adding a preamble. As will be discussed in greater detail later, the PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer.

The MAC layer checks the error detection code for each MAC packet to determine whether it was successfully decoded. If the error detection code for a MAC packet indicates that it was successfully decoded, then the payload for the MAC packet is provided to the application layer. If the error detection code for a MAC packet indicates that it was unsuccessfully decoded, the MAC packet is discarded. A Block ACKnowledgement (BACK) may be sent back to the transmitting node indicating which data packets were successfully decoded. The transmitting node uses the BACK to determine which data packets, if any, require retransmission.

Figure 2:
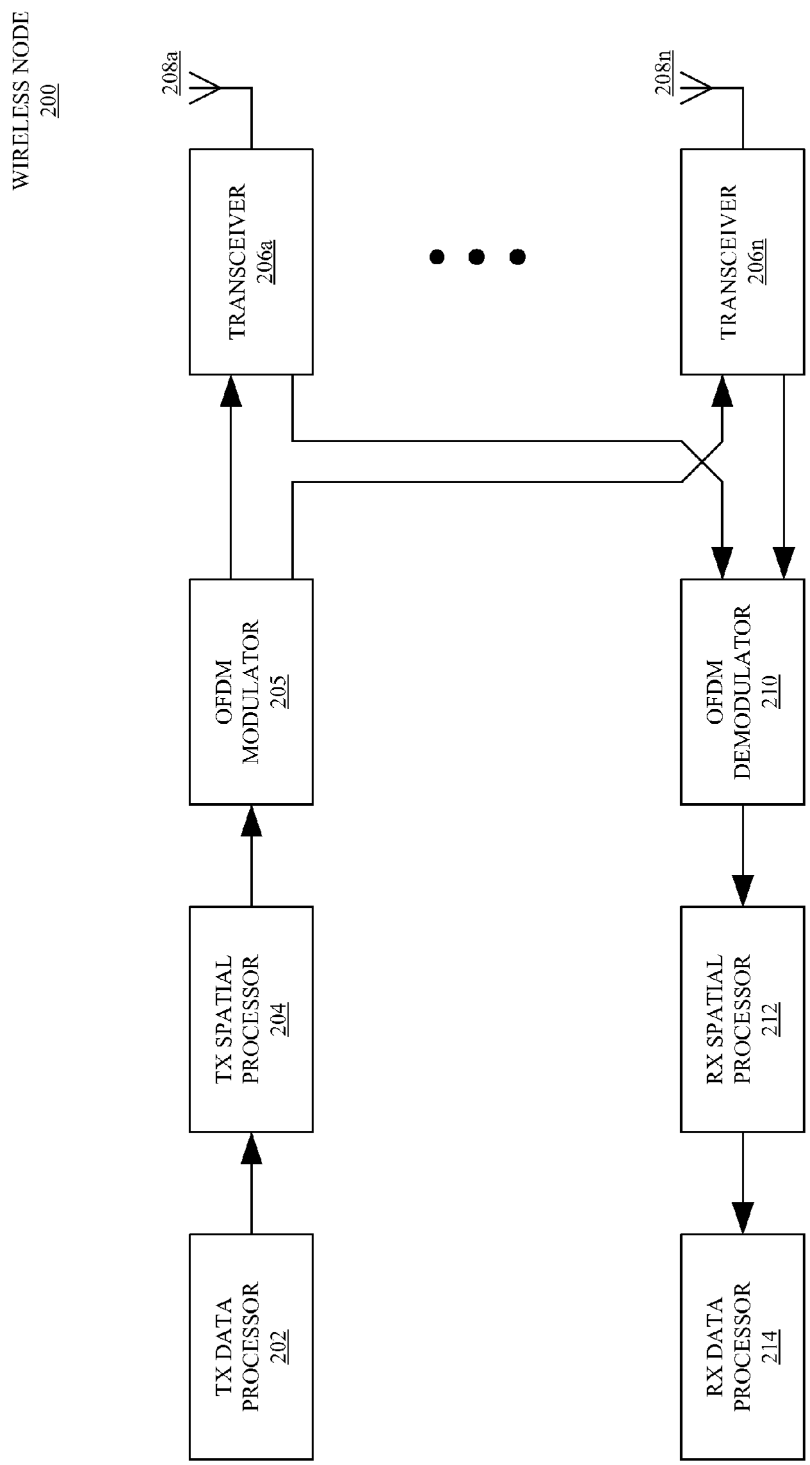
FIG. 2 is a block diagram of an example of signal processing functions of a Physical (PHY) layer of a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate Forward Error Correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to a TX spatial processor 204 that performs spatial processing of the modulation symbols. This may be accomplished by spatial precoding the modulation symbols before providing them to an OFDM modulator 205.

The OFDM modulator 205 splits the modulation symbols into parallel streams. Each stream is then mapped to an OFDM subcarrier and then combined together using an Inverse Fast Fourier Transform (IFFT) to produce a time domain OFDM stream. Each spatially precoded OFDM stream is then provided to a different antenna 208*a*-208*n* via a respective transceiver 206*a*-206*n*. Each transceiver 206*a*-206*n* modulates an RF carrier with a respective precoded stream for transmission over the wireless channel.

In a receive mode, each transceiver 206*a*-206*n* receives a signal through its respective antenna 208*a*-208*n*. Each transceiver 206*a*-206*n* may be used to recover the information modulated onto an RF carrier and provide the information to an OFDM demodulator 210.

In wireless nodes implementing OFDM, the stream (or combined stream) from the transceiver 206*a*-206*n* is provided to an OFDM demodulator 210. The OFDM demodulator 210 converts the stream (or combined stream) from time-domain to the frequency domain using a Fast Fourier Transform (FFT). The frequency domain signal comprises a separate stream for each subcarrier of the OFDM signal. The OFDM demodulator 210 recovers the data (i.e., modulation symbols) carried on each subcarrier and multiplexes the data into a stream of modulation symbols before sending the stream to a RX spatial processor 212.

The RX spatial processor 212 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 212.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

Traffic in a wireless communications system such as an IEEE 802.11e/n system can be broadly classified into “aggregate” or “stop and wait” flows. An aggregate flow is the one in which a transmitting station sends multiple frames back-to-back in a frame structure referred to as an Aggregate Mac Protocol Data Unit (AMPDU) without expecting an ACK frame after the transmission of a single Mac Protocol data Unit (MPDU), which is a basic transmission unit at the MAC layer. Thus, it is only after the reception of a complete AMPDU frame that the receiving station sends a Block Acknowledgment (BlockACK) frame, which indicates the successful reception of all the frames starting with a certain sequence number. This BlockACK frame typically includes a bitmap representing the success of receipt of each one of the multiple packets in the AMPDU. When a bit in the bitmap is set to “1”, it indicates that the respective packet at a location specified by: i) a Starting Sequence Number variable, plus ii) a Bit Position variable in the AMPDU was successfully received. Otherwise, if the bit is set to a “0”, it indicates the respective packet was not successfully received.

A stop and wait flow is the one where a transmitter expects the receiver to send an ACK frame after the successful reception of each MPDU. This mechanism is used in all legacy WLAN systems such those conforming to the IEEE 802.11a/b/g standards. In WLAN systems conforming to the IEEE 802.11e/n system, this acknowledgement mechanism is typically used for a flow with low data rate requirement and with very high delay constraint requirement. For a typical stop and wait flow in an IEEE 802.11 wireless LAN system, this basic ACK mechanism—rather than the BlockACK mechanism—is used. The frame format of an ACK frame for a stop and wait flow is discussed below.

Figure 3:
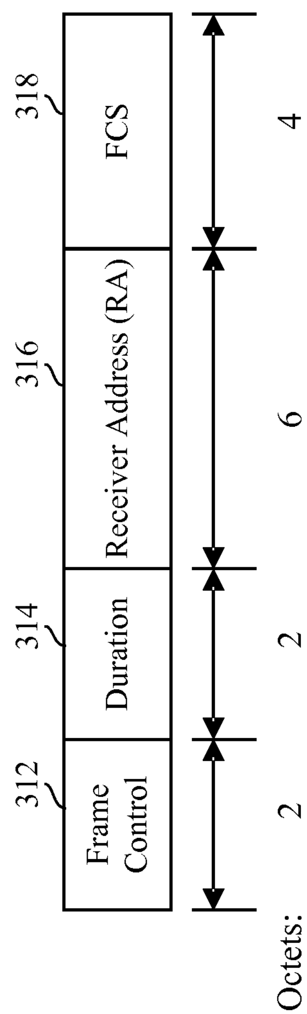
FIG. 3 is a diagram of a legacy acknowledgement (ACK) frame structure that is used in the wireless communications network of FIG. 1.

FIG. 3 illustrates a legacy (conventional) ACK frame 300. For a typical stop and wait flow approach, the legacy ACK frame 300 is used. As illustrated, the ACK frame 300 includes a Receiver Address (RA) field 316 in which is stored the address of the access point to which the station is addressing the ACK. The RA field 316 of the ACK is copied from the address of the immediately previous directed data, management or control frame (e.g., BlockAck Req, BlockAck control, or PS-Poll). The legacy ACK frame 300 also includes a frame control field 312, a duration field 314, and a Frame Check Sequence (FCS) field 318, which is the extra checksum data added to the ACK frame 300 in a communication protocol for error detection and correction. In one aspect, the detection of errors and then correction thereof may allow a packet that would normally not have been considered received successfully to be so. Specifically, a packet would be considered successfully received if any errors that were detected after the reception thereof were correctable.

When the access point has packets in multiple stop and wait flows to different stations, it can use one of the SDMA, TDMA using APPDU or OFDMA method to transmit data on the downlink. On the uplink, it is expected that all receiving stations (i.e., access terminals) that received the transmission successfully shall send an ACK back to the original transmitting station (i.e., the access point). In such cases, it is highly efficient to use a multiple access method such as SDMA or OFDMA to schedule these ACKs to be sent simultaneously. Due to the inherent structure of the ACK frame format 300, the receiving station of the ACKs can distinguish ACKs from one station to another. Thus, if one of the original receiving stations fails to send an ACK, the original transmitting station will not be able to determine which of the original receiving stations did not transmit an ACK. Hence with the current frame format, the only effective way is schedule these ACKs to transmit them in a time staggered fashion.

Figure 4:
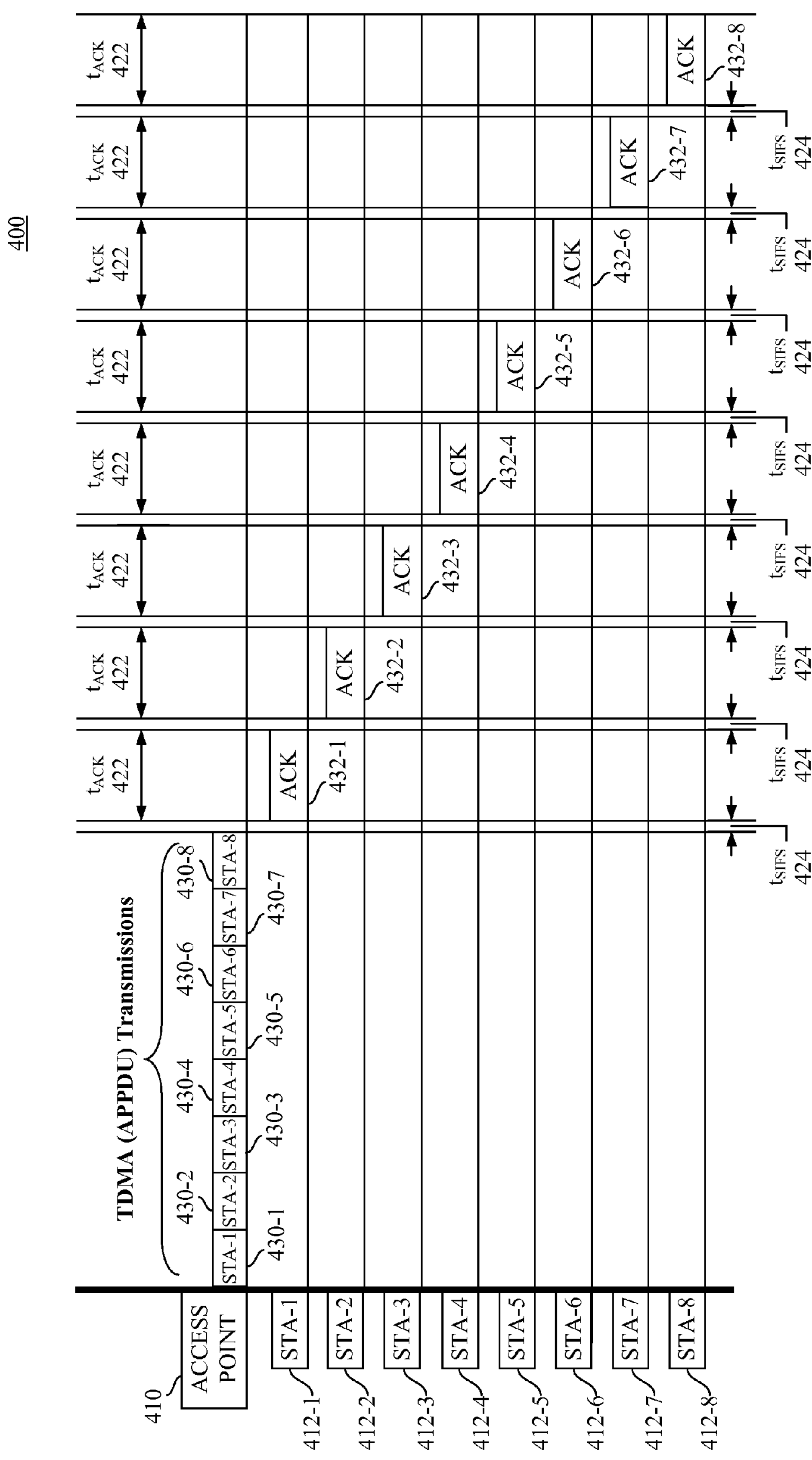
FIG. 4 is a timing diagram of a Time Division Multiple Access (TDMA) packet transmission and TDMA ACK transmission process using the legacy ACK frame structure of FIG. 3.

FIG. 4 illustrates an example TDMA APPDU downlink (DL) and a scheduled uplink (UL) timing diagram 400 of a plurality of TDMA transmissions STA-1 430-1 to STA-8 430-8 from an access point 410 to a plurality of stations STA-1 412-1 to STA-8 412-8. As illustrated, a SIFS time period $t_{SIFS}$ 424 is required between the end of the plurality of TDMA transmissions STA-1 430-1 to STA-8 430-8 and an ACK that, as illustrated, is sent by each station. Further, the $t_{SIFS}$ 424 is required between each ACK in a plurality of ACKs 432-1 to 432-8 sent by a respective station in the plurality of stations STA-1 412-1 to STA-8 412-8. In an aspect, the time to transmit each ACK is represented by an ACK transmission time $t_{ACK}$ 422. Thus, for an IEEE 802.11a preamble, the total ACK transmission time is determined by each time period $t_{ACK}$ 422 that it takes to transmit each ACK in the plurality of ACKs 432-1 to 432-8 and the SIFS period $t_{SIFS}$ 424 between each ACK. As an example, if $t_{SIFS}$ 424 is 16 microseconds (μs), assuming that the transmission rate is 65 megabits per second (Mbps), and $t_{ACK}$ 422 is 24 μs, then the total ACK transmission time is 320 μs, assuming that a $t_{SIFS}$ 424 is required before and after each ACK transmission in the plurality of ACKs 432-1 to 432-8. This is due to the reason that there is no unique information about the transmitting station in this ACK frame format. If the total data transmission time for the plurality of TDMA transmissions STA-1 430-1 to STA-8 430-8 is 104 μs, assuming a transmission rate of 130 Mbps, then total transmission time is 424 μs.

Figure 5:
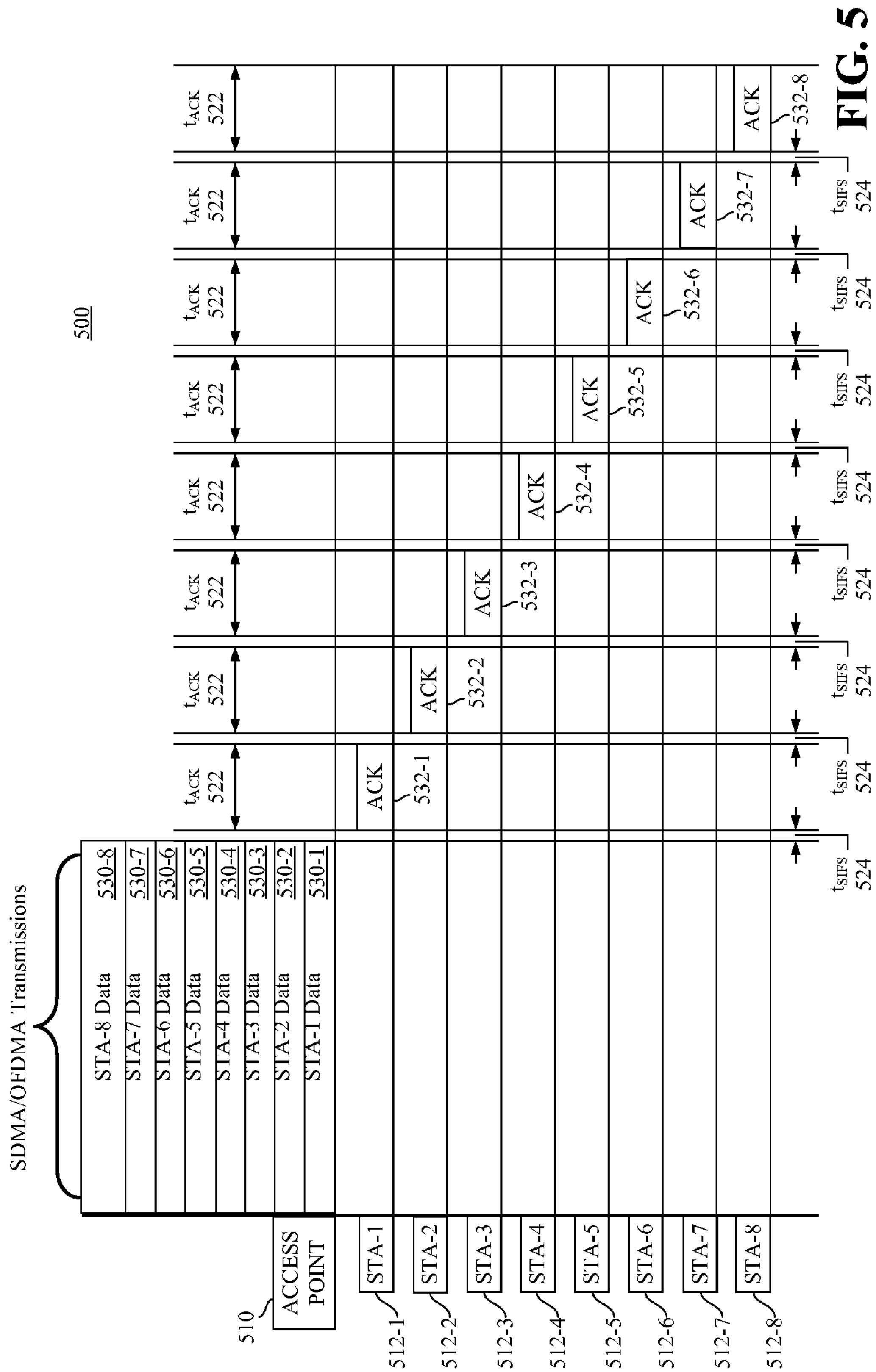
FIG. 5 is a timing diagram of a Spatial Division Multiple Access/Orthogonal Frequency Division Multiple Access (SDMA)/(OFDMA) packet transmission and TDMA ACK process using the legacy ACK frame structure of FIG. 3.

FIG. 5 illustrates an example SDMA DL and scheduled UL timing diagram 500 for an access point 510 that is 16×16 SDMA capable and a plurality of stations STA-1 512-1 to STA-8 512-8 that are each 2×2 SDMA capable. As illustrated, a plurality of SDMA transmissions STA-1 530-1 to STA-8 530-8 from the access point 510 to the plurality of stations STA-1 512-1 to STA-8 512-8. As illustrated, a SIFS time period $t_{SIFS}$ 524 is required between the end of the plurality of TDMA transmissions STA-1 530-1 to STA-8 530-8 and an ACK that, as illustrated, is sent by each station. Further, the $t_{SIFS}$ 524 is required between each ACK in a plurality of ACKs 532-1 to 532-8 sent by a respective station in the plurality of stations STA-1 512-1 to STA-8 512-8. In an aspect, the time to transmit each ACK is represented by an ACK transmission time $t_{ACK}$ 522. Thus, for an IEEE 802.11a preamble, the total ACK transmission time is determined by each time period $t_{ACK}$ 522 that it takes to transmit each ACK in the plurality of ACKs 532-1 to 532-8 and the SIFS period $t_{SIFS}$ 524 between each ACK. As an example, if $t_{SIFS}$ 524 is 16 μs, assuming that the transmission rate is 65 megabits per second (Mbps), and $t_{ACK}$ 522 is 24 μs, then the total ACK transmission time is 320 μs, assuming that a $t_{SIFS}$ 524 is required before and after each ACK transmission in the plurality of ACKs 532-1 to 532-8. This is due to the reason that there is no unique information about the transmitting station in this ACK frame format. If the total data transmission time for the plurality of TDMA transmissions STA-1 530-1 to STA-8 530-8 is 48 μs, assuming a transmission rate of 130 Mbps, then total transmission time is 368 μs, which is less than the transmission time of 424 μs from FIG. 4. However, the total transmission time of the plurality of ACKs 532-1 to 532-8 and the required SIFS period $t_{SIFS}$ 524 is 320 μs, which is unchanged from the total transmission time of the plurality of ACKs 432-1 to 432-8 and the SIFS period $t_{SIFS}$ 424. This is due to the reason that there is no unique information about the transmitting station in this ACK frame format.

In order to reduce time it takes to transmit the ACKs between each station (the original receiving station) and an access point (the transmitting station), an improved ACK frame format includes unique information about each ACK transmitting station in the ACK frame. As a result, multiple access methods such as SDMA or OFDMA may be used to transmit the ACKs concurrently from multiple stations because the sender of each ACK can be uniquely identified by the access point. In one aspect, the unique information is a transmitter MAC address. In another aspect, the unique information is a transmitter station ID, which is allocated as a unique 16-bit ID at a time of association of the station with the access point.

Figure 6:
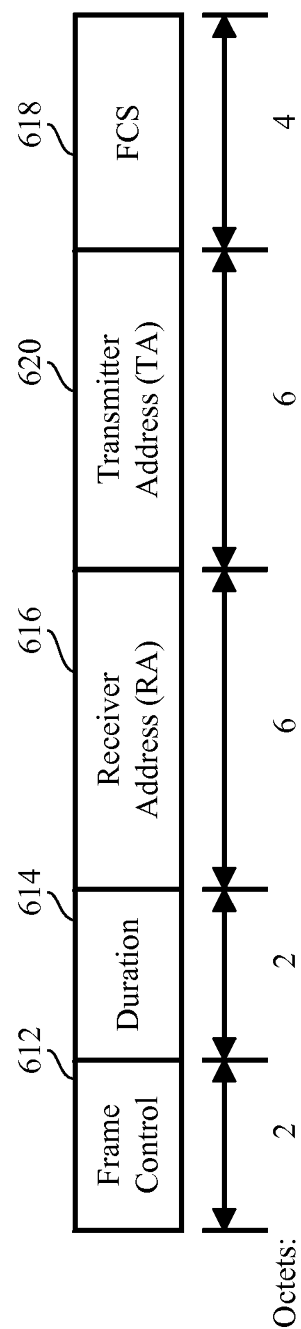
FIG. 6 is a diagram of a first improved ACK frame structure that may be used in the wireless communications network of FIG. 1.

FIG. 6 illustrates a first improved ACK frame 600, that includes a Receiver Address (RA) field 616 in which is stored the address of the access point to which the station is addressing the ACK. The RA field 616 of the ACK is copied from the address of the immediately previous directed data, management or control frame (e.g., BlockAck Req, BlockAck control, or PS-Poll). The first improved ACK frame 600 includes a Transmitter MAC Address (TA) field 620. In one aspect, the TA field 620 is 6 bytes in length. The first improved ACK frame 600 also includes a frame control field 612, a duration field 614, and a Frame Check Sequence (FCS) field 618, which is the extra checksum data added to the first improved ACK frame 600 in a communication protocol for error detection and correction.

Figure 7:
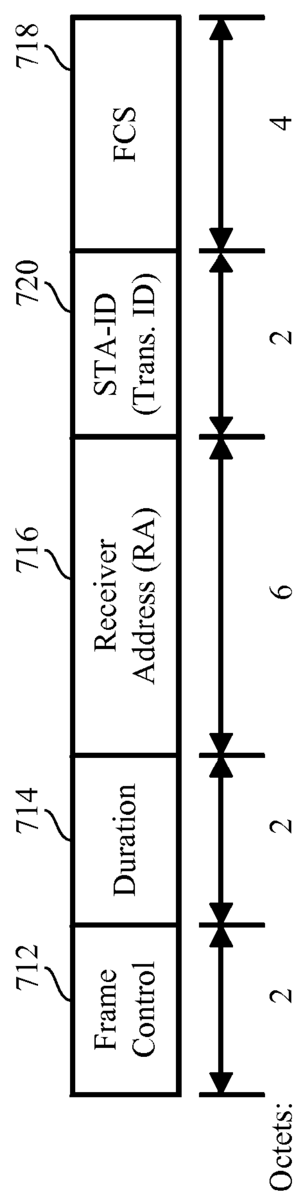
FIG. 7 is a diagram of a second improved ACK frame structure that may be used in the wireless communications network of FIG. 1.

FIG. 7 illustrates a second improved ACK frame 700, that includes a Receiver Address (RA) field 716 in which is stored the address of the access point to which the station is addressing the ACK. The RA field 716 of the ACK is copied from the address of the immediately previous directed data, management or control frame (e.g., BlockAck Req, BlockAck control, or PS-Poll). The first improved ACK frame 700 includes a Transmitter Identifier (STA-ID) field 720. In one aspect, the STA-ID field 720 is 2 bytes in length. The transmitter ID is also referred to as an association ID, which is assigned to the station when the station associates with the access point. The second improved ACK frame 700 also includes a frame control field 712, a duration field 714, and a Frame Check Sequence (FCS) field 718, which is the extra checksum data added to the second improved ACK frame 700 in a communication protocol for error detection and correction.

As discussed previously, when the access point is sending packets in multiple stop and wait flows to different stations, it can use one of the SDMA, TDMA using APPDU or OFDMA method to transmit data on the downlink. On the uplink, it is expected that all the original receiving stations that received the transmission successfully shall send an ACK back to the original transmitting station. In such cases, it is highly efficient to use a multiple access method such as SDMA or OFDMA to schedule these ACKs to be sent concurrently. Using the first improved ACK frame format 600 or the second improved ACK frame format 700, the access point, which is the receiving station of the ACKs, can distinguish ACKs from one station to another. Thus, if one of the original receiving stations fails to send an ACK, the original transmitting station will be able to determine which of the original receiving stations did not transmit an ACK. Hence with the improved frame formats, an efficient way to transmit these ACKs is in a simultaneous fashion.

Figure 8:
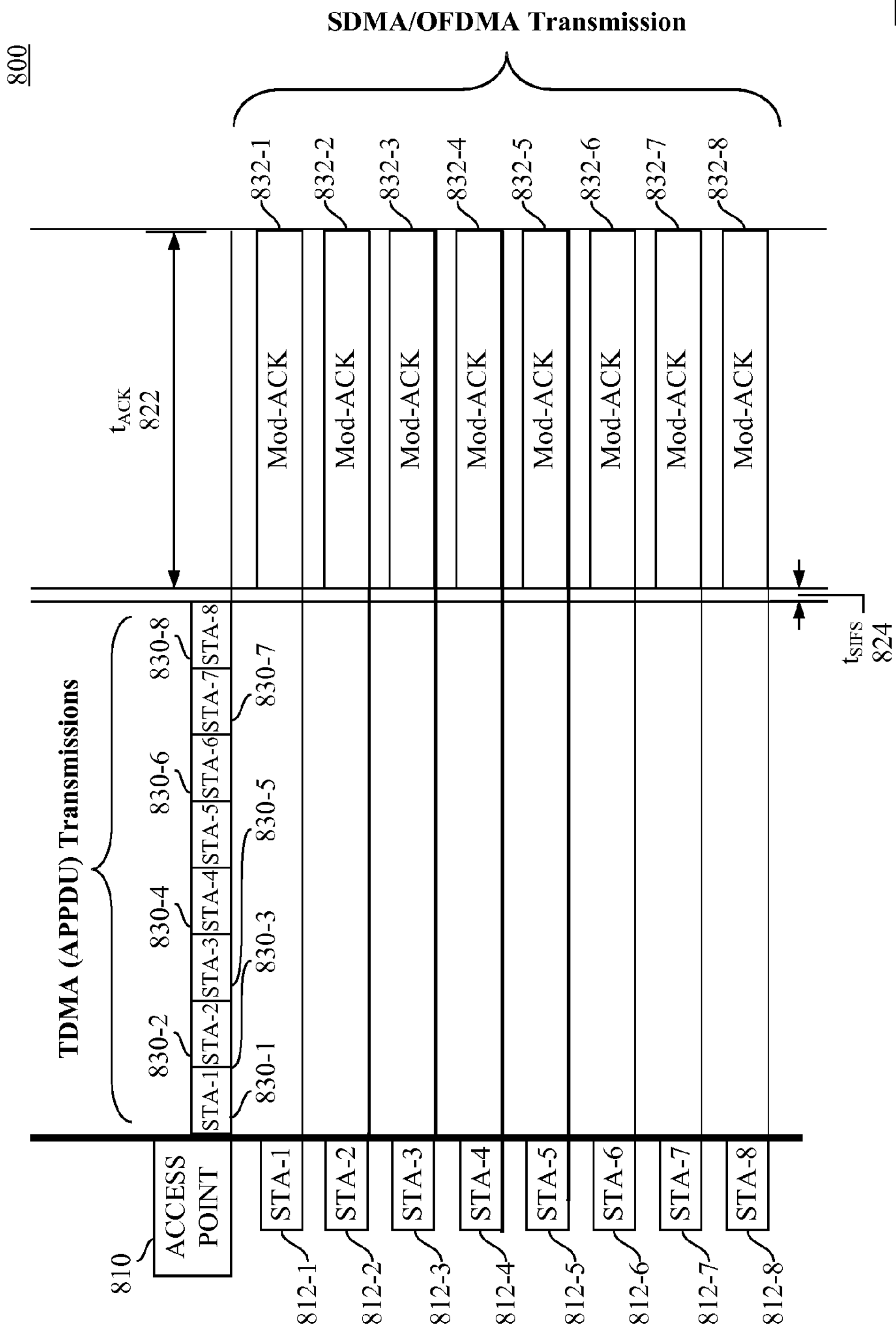
FIG. 8 is a timing diagram of a TDMA packet transmission and SDMA/OFDMA ACK transmission process using the first improved ACK frame structure of FIG. 6 or the second improved ACK frame structure of 7.
Figure 9:
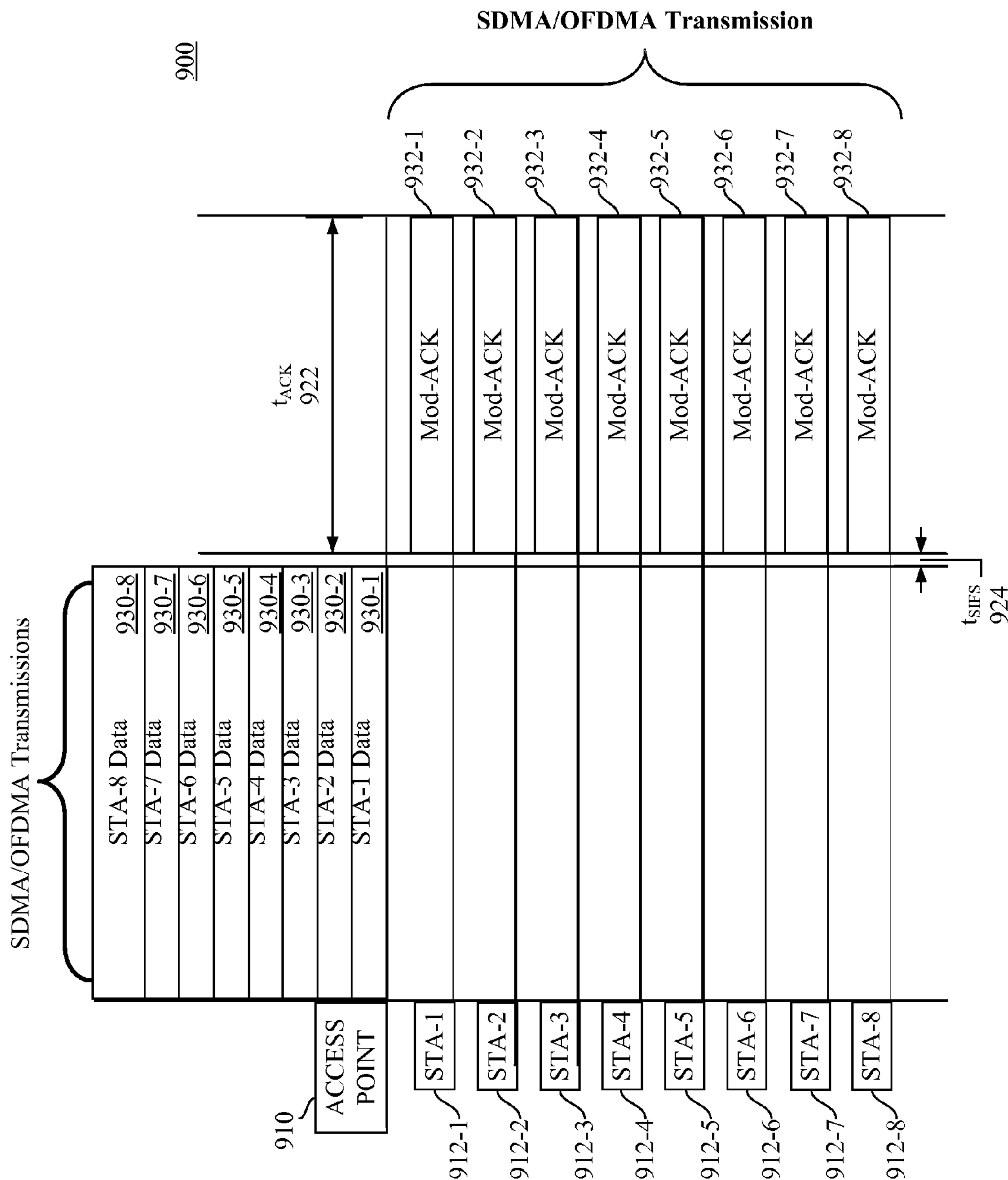
FIG. 9 is a timing diagram of a SDMA/OFDMA packet transmission and SDMA/OFDMA ACK process using the first improved ACK frame structure of FIG. 6 or the second improved ACK frame structure of 7.

FIGS. 8 and 9 illustrate frame exchange sequences when multiple access technologies such as SDMA or OFDMA are used to transmit ACKs. In each of these figures, the total transmission time needed to transmit a typical G711 Voice over IP (VoIP) packet that is 232 bytes long to 8 stations simultaneously is shown. The reduced transmission time in these two cases is mainly due to the reduced ACK transmission time which is possible due to the improved frame formats, as further explained below.

FIG. 8 illustrates an example TDMA APPDU downlink (DL) and a SDMA uplink (UL) timing diagram 800 for an access point 810 that is 16×16 SDMA capable and a plurality of stations STA-1 812-1 to STA-8 812-8 that are each 2×2 SDMA capable. The timing diagram 800 includes a plurality of TDMA transmissions STA-1 830-1 to STA-8 830-8 from the access point 810 to the plurality of stations STA-1 812-1 to STA-8 812-8. As illustrated, a SIFS time period $t_{SIFS}$ 824 is required between an end of the plurality of TDMA transmissions STA-1 830-1 to STA-8 830-8 and a beginning of a plurality of ACKs 832-1 to 832-8 that are all simultaneously concurrently, each transmitted by a respective station in the plurality of stations STA-1 812-1 to STA-8 812-8 that, as illustrated, are sent by each station. Only one $t_{SIFS}$ 824 is required as the plurality of ACKs 832-1 to 832-8 are concurrently transmitted, each by a respective station in the plurality of stations STA-1 812-1 to STA-8 812-8. In an aspect, the time to transmit each ACK is represented by an ACK transmission time $t_{ACK}$ 822. The total ACK transmission time equals the time of the SIFS period $t_{SIFS}$ 824 and the time $t_{ACK}$ 822 that it takes to simultaneously transmit each ACK in the plurality of ACKs 832-1 to 832-8. As an example, if $t_{SIFS}$ 824 is 16 μs, assuming that the transmission rate is 65 megabits per second (Mbps), and $t_{ACK}$ 822 is 92 μs, then the total ACK transmission time is 108 μs, assuming that one $t_{SIFS}$ 824 is required before all ACK transmissions in the plurality of ACKs 832-1 to 832-8. If the total data transmission time for the plurality of TDMA transmissions STA-1 830-1 to STA-8 830-8 is 104 μs, assuming a transmission rate of 130 Mbps, then total transmission time is 212 μs.

FIG. 9 illustrates an example TDMA APPDU downlink (DL) and a SDMA uplink (UL) timing diagram 900 for an access point 910 that is 16×16 SDMA capable and a plurality of stations STA-1 912-1 to STA-8 912-8 that are each 2×2 SDMA capable. The timing diagram 900 includes a plurality of simultaneous SDMA/OFDMA transmissions STA-1 930-1 to STA-8 930-8 from the access point 910 to the plurality of stations STA-1 912-1 to STA-8 912-8. As illustrated, a SIFS time period $t_{SIFS}$ 924 is required between an end of the plurality of SDMA/OFDMA transmissions STA-1 930-1 to STA-8 930-8 and a beginning of a plurality of ACKs 932-1 to 932-8 that are all simultaneously transmitted, each transmitted by a respective station in the plurality of stations STA-1 912-1 to STA-8 912-8 that, as illustrated, are sent by each station. Only one $t_{SIFS}$ 924 is required as the plurality of ACKs 932-1 to 932-8 are simultaneously transmitted, each by a respective station in the plurality of stations STA-1 912-1 to STA-8 912-8. In an aspect, the time to transmit each ACK is represented by an ACK transmission time $t_{ACK}$ 922. The total ACK transmission time equals the time of the SIFS period $t_{SIFS}$ 924 and the time $t_{ACK}$ 922 that it takes to simultaneously transmit each ACK in the plurality of ACKs 932-1 to 932-8. As an example, if $t_{SIFS}$ 924 is 16 μs, assuming that the transmission rate is 65 megabits per second (Mbps), and $t_{ACK}$ 922 is 92 μs, then the total ACK transmission time is 108 μs, assuming that one $t_{SIFS}$ 924 is required before all ACK transmissions in the plurality of ACKs 932-1 to 932-8. If the total data transmission time for the plurality of SDMA/OFDMA transmissions STA-1 930-1 to STA-8 930-8 is 48 μs, assuming a transmission rate of 130 Mbps, then total transmission time is 156 μs.

Figure 10:
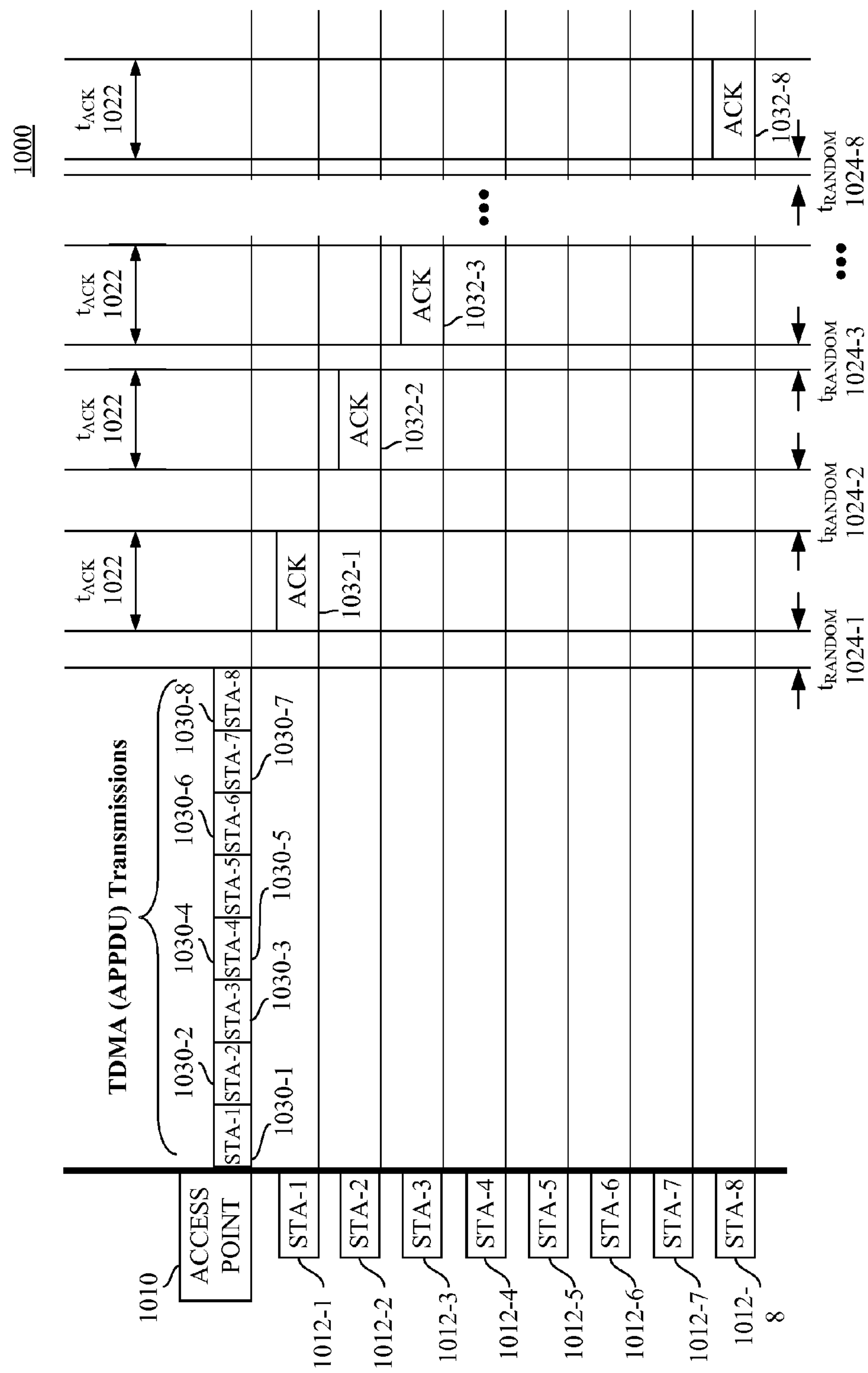
FIG. 10 is a timing diagram of another ACK process using the first improved ACK frame structure of FIG. 6 or the second improved ACK frame structure of 7.

FIG. 10 illustrates an example TDMA APPDU downlink (DL) and a scheduled uplink (UL) timing diagram 1000 of a plurality of TDMA transmissions STA-1 1030-1 to STA-8 1030-8 from an access point 1010 to a plurality of stations STA-1 1012-1 to STA-8 1012-8. As illustrated, each of the plurality of stations STA-1 1012-1 to STA-8 1012-8 returns an ACK in a plurality of ACKs 1032-1 to 1032-8 sent by a respective station in the plurality of stations STA-1 1012-1 to STA-8 1012-8. Each ACK is sent in a contention method where random time periods $t_{RANDOM}$ 1024-1 to 1024-8 are used. The enhanced ACK frame format of FIG. 6 may be used and, in this simplified ACK technique, the ACK messages are not required to be sent synchronously with SIFS spacing. In an aspect, the time to transmit each ACK is represented by an ACK transmission time $t_{ACK}$ 1022. Thus, for an IEEE 802.11a preamble, the total ACK transmission time is determined by each time period $t_{ACK}$ 1022 that it takes to transmit each ACK in the plurality of ACKs 1032-1 to 1032-8 and the random period $t_{RANDOM}$ 1024-1 to 1024-8 before each ACK.

Figure 11:
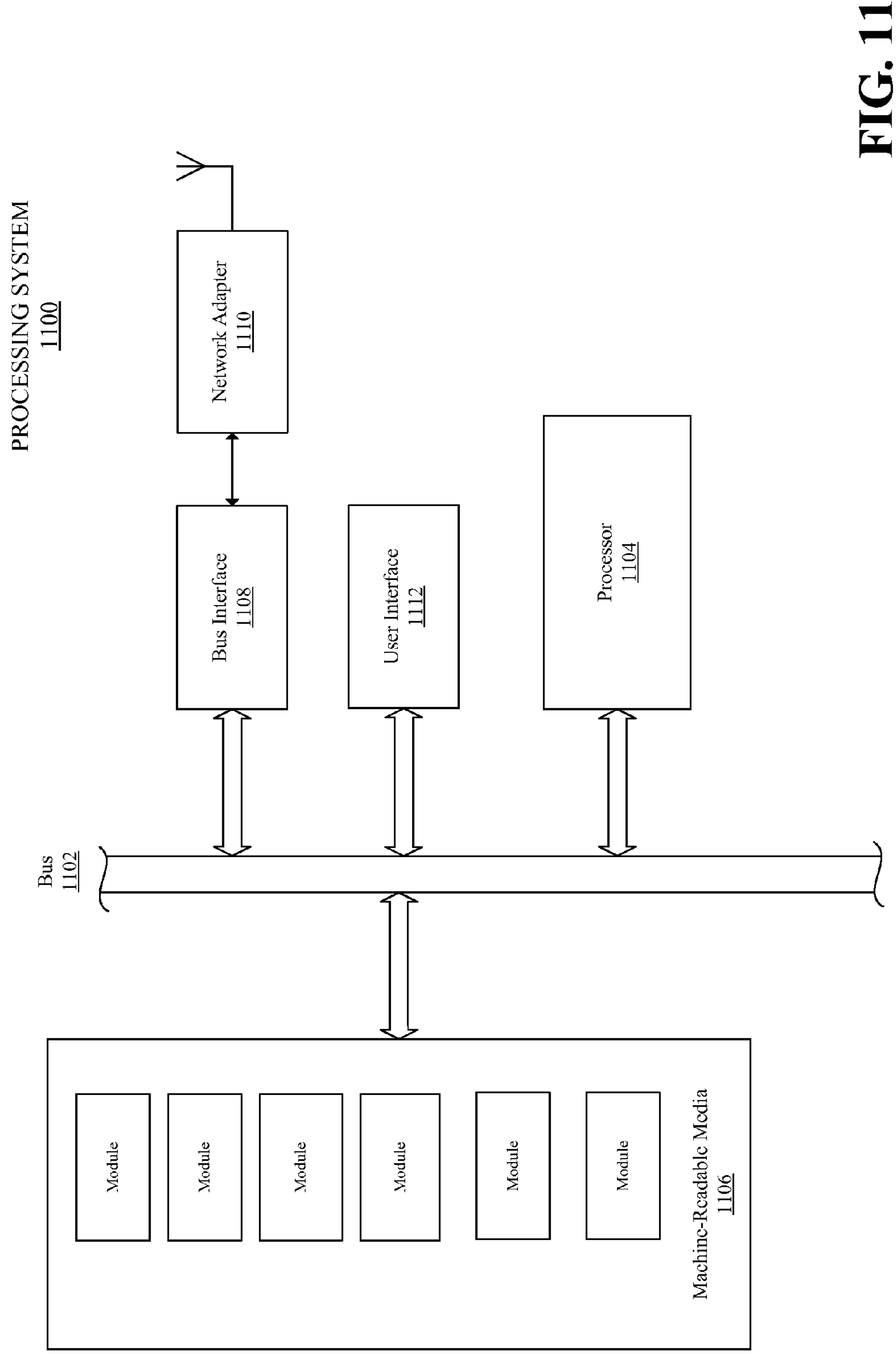
FIG. 11 is a block diagram illustrating an example of a hardware configuration for a processing system in a wireless node in the wireless communications network of FIG. 1; and, FIG. 12 is a block diagram of a communication apparatus configured in accordance with an aspect of the disclosure.
Figure 12:
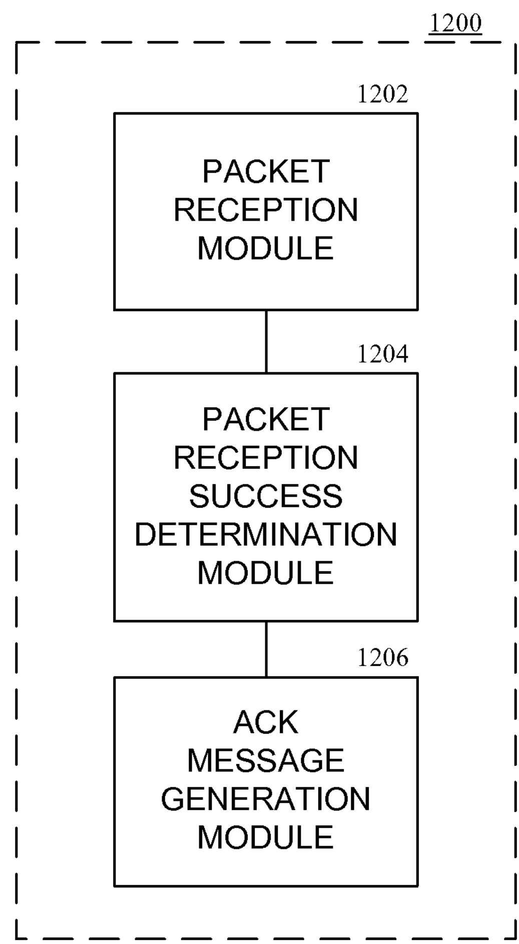

FIG. 11 is a conceptual diagram illustrating an example of a hardware configuration for a processing system in a wireless node. In this example, the processing system 1100 may be implemented with a bus architecture represented generally by bus 1102. The bus 1102 may include any number of interconnecting buses and bridges depending on the specific application of the processing system 1100 and the overall design constraints. The bus links together various circuits including a processor 1104, machine-readable media 1106, and a bus interface 1108. The bus interface 1108 may be used to connect a network adapter 1110, among other things, to the processing system 1100 via the bus 1102. The network interface 1110 may be used to implement the signal processing functions of the PHY layer. In the case of an access terminal 110 (see FIG. 1), a user interface 1112 (e.g., keypad, display, mouse, joystick, etc.) may also be connected to the bus. The bus 1102 may also link various other circuits such as timing sources, peripherals, voltage regulators, power management circuits, and the like, which are well known in the art, and therefore, will not be described any further.

The processor 1104 is responsible for managing the bus and general processing, including the execution of software stored on the machine-readable media 1108. The processor 1108 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable may be embodied in a computer-program product. The computer-program product may comprise packaging materials.

In the hardware implementation illustrated in FIG. 11, the machine-readable media 1106 is shown as part of the processing system 1100 separate from the processor 1104. However, as those skilled in the art will readily appreciate, the machine-readable media 1106, or any portion thereof, may be external to the processing system 1100. By way of example, the machine-readable media 1106 may include a transmission line, a carrier wave modulated by data, and/or a computer product separate from the wireless node, all which may be accessed by the processor 1104 through the bus interface 1108. Alternatively, or in addition to, the machine readable media 1104, or any portion thereof, may be integrated into the processor 1104, such as the case may be with cache and/or general register files.

The processing system 1100 may be configured as a general-purpose processing system with one or more microprocessors providing the processor functionality and external memory providing at least a portion of the machine-readable media 1106, all linked together with other supporting circuitry through an external bus architecture. Alternatively, the processing system 1100 may be implemented with an ASIC (Application Specific Integrated Circuit) with the processor 1104, the bus interface 1108, the user interface 1112 in the case of an access terminal), supporting circuitry (not shown), and at least a portion of the machine-readable media 1106 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 1100 depending on the particular application and the overall design constraints imposed on the overall system.

The machine-readable media 1106 is shown with a number of software modules. The software modules include instructions that when executed by the processor 1104 cause the processing system 1100 to perform various functions. Each software module may reside in a single storage device or distributed across multiple storage devices. By way of example, a software module may be loaded into RAM from a hard drive when a triggering event occurs. During execution of the software module, the processor 1104 may load some of the instructions into cache to increase access speed. One or more cache lines may then be loaded into a general register file for execution by the processor 1104. When referring to the functionality of a software module below, it will be understood that such functionality is implemented by the processor 1104 when executing instructions from that software module.

FIG. 11 is a block diagram illustrating an example of the functionality of an apparatus for communication 1100 according to another aspect of the disclosure. The apparatus for communication 1100 includes a packet reception module 1102 for receiving a transmission for a packet; a packet reception success determination module 1104 for determining that the transmitted packet has been received successfully; and a ACK message generation module 1106 for generating an ACK message upon the determination that the transmitted packet is received successfully, wherein the ACK message includes a unique identifier associated with a receiver.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

The disclosure is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the disclosure may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the disclosure. It should be appreciated that those skilled in the art will be able to devise various arrangements, which, although not explicitly described or shown herein, embody the principles of the disclosure and are included within its scope. Furthermore, all examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the disclosure. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

It is understood that any specific order or hierarchy of steps described in the context of a software module is being presented to provide an examples of a wireless node. Based upon design preferences, it is understood that the specific order or hierarchy of steps may be rearranged while remaining within the scope of the disclosure.

Although various aspects of the disclosure have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean “one and only one” unless specifically so stated, but rather “one or more.” Unless specifically stated otherwise, the term “some” refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase “means for” or, in the case of a method claim, the element is recited using the phrase “step for.”

What is claimed is:

1. A method comprising:

receiving a wireless communication packet at a first device, wherein the wireless communication packet is transmitted from a transmitter to the first device and to at least one second device;

generating, at the first device, a wireless communication acknowledgment (ACK) message upon a determination by the first device that the first device successfully received the wireless communication packet, wherein the wireless communication ACK message includes a Medium Access Control (MAC) layer identifier that identifies the first device; and transmitting the wireless communication ACK message at a scheduled time to the transmitter, wherein the scheduled time corresponds to a time when the wireless communication ACK message and a second wireless communication ACK message generated by the at least one second device are to be concurrently transmitted to the transmitter from the first device and the at least one second device.

2. The method of claim 1, wherein the wireless communication ACK message is transmitted to the transmitter via a Spatial Division Multiple Access (SDMA) transmission or via an Orthogonal Frequency Division Multiple Access (OFDMA) transmission.

3. The method of claim 1, further comprising transmitting the wireless communication ACK message via a transceiver of the first device.

4. The method of claim 1, further comprising providing a payload of the wireless communication packet to an application layer of the first device upon determining that the first device successfully received the wireless communication packet.

5. The method of claim 1, wherein the MAC layer identifier comprises a network address of the first device.

6. The method of claim 1, wherein the MAC layer identifier comprises a station identifier assigned by an access point to the first device.

7. The method of claim 6, further comprising:

registering the first device with the access point; and receiving the station identifier from the access point at the first device after registering the first device with the access point.

8. The method of claim 1, wherein the determination that the first device successfully received the wireless communication packet comprises detecting that no uncorrectable errors occurred during reception of the wireless communication packet.

9. The method of claim 1, wherein the scheduled time corresponds to a period of time that is long enough for the first device to decode the wireless communication packet and check for errors in the wireless communication packet.

10. The method of claim 9, wherein the first device checks for errors by computing a cyclic redundancy check.

11. The method of claim 1, wherein the wireless communication packet is an aggregate packet.

12. An apparatus comprising:

means for determining that a wireless communication packet is received successfully at the apparatus, wherein the wireless communication packet is transmitted from a transmitter to the apparatus and to at least one device;

means for generating a wireless communication acknowledgment (ACK) message upon a determination by the means for determining that the wireless communication packet is received successfully, wherein the wireless communication ACK message includes a Medium Access Control (MAC) layer identifier that identifies the apparatus; and means for transmitting the wireless communication ACK message at a scheduled time to the transmitter, wherein the scheduled time corresponds to a time when the wireless communication ACK message and a second wireless communication ACK message generated by the at least one device are to be concurrently transmitted to the transmitter from the apparatus and the at least one device.

13. The apparatus of claim 12, wherein the wireless communication packet is transmitted by the transmitter via a Time Division Multiple Access (TDMA) transmission, a via Spatial Division Multiple Access (SDMA) transmission or via an Orthogonal Frequency Division Multiple Access (OFDMA) transmission.

14. The apparatus of claim 12, wherein the means for transmitting the wireless communication ACK message comprises a transceiver.

15. The apparatus of claim 12, wherein the means for generating the wireless communication ACK message discards the wireless communication packet after the means for determining that the wireless communication packet is received successfully determines that the wireless communication packet is not received successfully.

16. The apparatus of claim 14, wherein the wireless communication packet is an aggregate packet.

17. The apparatus of claim 12, wherein the MAC layer identifier comprises a network address of the apparatus.

18. The apparatus of claim 12, wherein the MAC layer identifier comprises a station identifier assigned to the apparatus by an access point.

19. The apparatus of claim 18, further comprising:

means for registering with the access point; and means for receiving the station identifier from the access point after registration by the means for registering with the access point.

20. The apparatus of claim 12, wherein the means for determining that the wireless communication packet is received successfully comprises means for detecting that no uncorrectable errors occurred during reception of the wireless communication packet.

21. The apparatus of claim 12, wherein the scheduled time corresponds to a period of time that is long enough for the means for determining that a wireless communication packet is received successfully to decode the wireless communication packet and check for errors in the wireless communication packet.

22. The apparatus of claim 21, wherein the means for determining that a wireless communication packet is received successfully checks for errors by computing a cyclic redundancy check.

23. An apparatus comprising:

a processing system configured to:

receive a wireless communication packet, wherein the wireless communication packet is transmitted from a transmitter to the apparatus and to at least one device;

generate a wireless communication acknowledgment (ACK) message upon a determination that the wireless communication packet is received successfully, wherein the wireless communication ACK message includes a Medium Access Control (MAC) layer identifier that identifies the apparatus; and transmit the wireless communication ACK message at a scheduled time to the transmitter, wherein the scheduled time corresponds to a time when the wireless communication ACK message and a second wireless communication ACK message generated by the at least one device are to be concurrently transmitted to the transmitter from the apparatus and the at least one device.

24. The apparatus of claim 23, wherein the wireless communication ACK message is transmitted to the transmitter via a Spatial Division Multiple Access (SDMA) transmission or via an Orthogonal Frequency Division Multiple Access (OFDMA) transmission.

25. The apparatus of claim 23, further comprising a transceiver configured to transmit the wireless communication ACK message.

26. The apparatus of claim 23, wherein the wireless communication ACK message includes a second MAC layer identifier that identifies the transmitter.

27. The apparatus of claim 25, wherein the wireless communication packet is an aggregate packet.

28. The apparatus of claim 23, wherein the MAC layer identifier comprises a network address of the apparatus.

29. The apparatus of claim 23, wherein the MAC layer identifier comprises a station identifier of the apparatus assigned by an access point.

30. The apparatus of claim 29, wherein:

the processing system is further configured to register with the access point; and the apparatus is further configured to receive the station identifier from the access point after the processing system registers with the access point.

31. The apparatus of claim 23, wherein the processing system is further configured to detect that no uncorrectable errors occurred during reception of the wireless communication packet.

32. The apparatus of claim 23, wherein the scheduled time corresponds to a period of time that is long enough for the apparatus to decode the wireless communication packet, and check errors in the wireless communication packet.

33. The apparatus of claim 32, wherein the apparatus checks for errors by computing a cyclic redundancy check.

34. A computer-program product comprising:

a computer-readable storage device encoded with instructions executable by a processor to cause the processor to:

receive a wireless communication packet at a first device, wherein the wireless communication packet is transmitted from a transmitter to the first device and to at least one second device;

generate a wireless communication acknowledgment (ACK) message upon a determination that the wireless communication packet is received successfully, wherein the wireless communication ACK message includes a Medium Access Control (MAC) layer identifier that identifies the first device; and transmit the wireless communication ACK message at a scheduled time to the transmitter, wherein the scheduled time corresponds to a time when the wireless communication ACK message and a second wireless communication ACK message generated by the at least one second device are to be concurrently transmitted to the transmitter from the first device and the at least one second device.

35. The computer-program product of claim 34, wherein the wireless communication packet is an aggregate packet.

36. An access terminal, comprising:

a processing system configured to:

receive a wireless communication packet, wherein the wireless communication packet is transmitted from a transmitter to the access terminal and to at least one device;

generate a wireless communication acknowledgment (ACK) message upon a determination that the wireless communication packet is received successfully, wherein the wireless communication ACK message includes a Medium Access Control (MAC) layer identifier that identifies the access terminal; and transmit the wireless communication ACK message at a scheduled time to the transmitter, wherein the scheduled time corresponds to a time when the wireless communication ACK message and a second wireless communication ACK message generated by the at least one device are to be concurrently transmitted to the transmitter from the access terminal and the at least one device.

37. The access terminal of claim 36, wherein the wireless communication packet is an aggregate packet.

38. An access point, comprising: a transmitter to transmit a wireless communication packet to a plurality of access terminals; a wireless network adapter configured to receive a plurality of concurrently transmitted wireless communication acknowledgement (ACK) messages from the plurality of access terminals, wherein the plurality of access terminals are configured to concurrently transmit the wireless communication ACK messages at a particular time, wherein each wireless communication ACK message includes a Medium Access Control (MAC) layer identifier that identifies an access terminal that transmitted the wireless communication ACK message; and a processing system configured to decode each received wireless communication ACK message received in response to transmission of the wireless communication packet and configured to determine which access terminals successfully received the wireless communication packet based on the MAC layer identifier in each received wireless communication ACK message received in response to transmission of the wireless communication packet, wherein each received ACK message was scheduled to be transmitted concurrently with other wireless communication ACK messages at the particular time in response to the wireless communication packet.

* * * * *